United States Patent Office 3,792,136
Patented Feb. 12, 1974

3,792,136
METHOD FOR PREPARING HOLLOW METAL OXIDE MICROSPHERE
Charles R. Schmitt, Oak Ridge, Tenn., assignor to the United States of America as represented by the United States Atomic Energy Commission
No Drawing. Filed Nov. 2, 1971, Ser. No. 195,052
Int. Cl. B29d 27/08
U.S. Cl. 264—44    8 Claims

ABSTRACT OF THE DISCLOSURE

Hollow refractory metal oxide microspheres are prepared by impregnating resinous microspheres with a metallic compound, drying the impregnated microspheres, heating the microspheres slowly to carbonize the resin, and igniting the microspheres to remove the carbon and to produce the metal oxide.

CONTRACTUAL ORIGIN OF THE INVENTION

This invention was made in the course of, or under, a contract with the United States Atomic Energy Commission.

BACKGROUND OF THE INVENTION

This invention relates to a process of producing highly porous hollow metal oxide microspheres.

Microspheres, both solid and hollow, have been of considerable interest during the last decade because of their high strength to weight ratio and because of their high surface to volume ratios. Organic microspheres have been used in the chemical industries as floating covers for liquids; thus providing protection from evaporation and insulation. Inorganic microspheres have use as fuels for nuclear reactors. Porous hollow inorganic microspheres have utility, as both high and low temperature insulation, and as shock absorbers in vibrational environments. Hollow inorganic microspheres may also be bound together to form a low density syntactic body with high temperature strength. Such syntactic bodies are useful as landing sites for vertical take-off aircraft. Similarly, the syntactic bodies may be used as a heat resistant insulation to protect a spacecraft during re-entry.

Heretofore, hollow inorganic microspheres have been produced by fusing a mixture of the inorganic material and a gassing agent as is disclosed in U.S. Pat. No. 2,978,340. Certain oxide materials have also been formed into hollow microspheres by dropping solid microspheres through an induction-coupled plasma torch as is described by W. S. Gilman in the Bulletin of the American Ceramic Society, pp. 593–595, vol. 46, No. (1967). These methods suffer from the disadvantage that the product does not have a uniform size and that all of the microspheres are not hollow, thus requiring additional separations.

Hollow metallic spheres have been produced by coating a phenolic resin microsphere and then coking and vaporizing the resin. However, this method is not readily adaptable for use in producing oxide microspheres. Solid metal oxide microspheres have been produced by ion exchanging a metal cation into a cation exchange resin and then igniting the resin to leave a solid metal oxide microsphere as is described in U.S. Pat. No. 3,438,749. This method suffers from the disadvantage that the process is applicable to only a limited number of resins and that the resulting product is solid. This process is further limited in that it cannot readily be used for producing microspheres consisting of more than a single oxide.

Textile fibers have been impregnated to produce oxide fibers as is disclosed in U.S. Pat. No. 3,385,915. However, this method is limited to producing only fibers and requires long soaking periods.

SUMMARY OF THE INVENTION

It is an object of this invention to produce novel hollow metal oxide microspheres of uniform size.

It is another object of this invention to produce highly porous hollow metal oxide microspheres.

It is a further object of this invention to produce hollow metal oxide microspheres by a novel process in which any thermosetting resin which does not go through a melting phase during pyrolysis may be used.

It is a still further object of this invention to produce hollow metal oxide microspheres of virtually any desired size.

It is a still further object of this invention to provide a novel process in which hollow microspheres composed of mixed metal oxides may be produced.

These and other objects are accomplished by impregnating hollow thermosetting resin microspheres with a solution of an oxidizable metal compound or a mixture of oxidizable metal compounds and precipitating the metal in situ as an hydroxide to produce an impregnated microsphere. The impregnated microsphere is slowly dried and then carbonized by heating in an inert atmosphere. The final oxide microsphere is produced by igniting the carbonized microsphere to burn off the carbon and produce the metal oxide, thus leaving the oxide in the form of a hollow porous microsphere.

DETAILED DESCRIPTION

According to this invention hollow thermosetting resin microspheres may be impregnated with a metallic compound by either dissolving a metallic compound into the resin prior to forming the resin microspheres and then further impregnating the formed resin microspheres with a solution of the metallic compound or by only impregnating the formed microspheres.

The type of resin used for the initial microsphere is limited to only those resins which are classified as thermosetting. Any thermosetting resin which does not have a melting phase during thermal pyrolysis is useful in the process. Resins which are useful include polyfurfuryl alcohol, vinylidene-acrylonitrile copolymer, and styrene-divinylbenzene copolymer as well as phenolic and epoxy resins. Hollow resin microspheres are available from Emerson and Cuming, Inc., Canton, Massachusetts, in a variety of wall thicknesses and particle diameters.

The formed resin microspheres are impregnated by soaking in a saturated solution of a metallic compound or mixture of metallic compounds. The metallic compound must be an oxidizable salt which is soluble in an aqueous solvent. Metal salts which are useful include the halides, nitrides, sulfates, oxychlorides, acetates and soluble silicates. After soaking the resin microspheres in the solution to saturation, the metallic salt is precipitated as an hydroxide in situ by adjusting the pH of the solution with a basic addition. As a part of the impregnation process, the precipitation step leads to higher loadings than can be achieved with soaking alone. This higher loading is necessary for achieving structural stability in the resulting product. Lower loadings produce an extremely friable product which is not satisfactory. If the resin microspheres are soaked to saturation and then dried without the intervening precipitation step, a significant amount of the metal compound will be lost due to drainage. The metal compound that remains will tend to migrate to the surface of the microsphere during drying. This reduces the wall thickness of the ultimate product, causing a further decrease in the stability of the product. By precipitating the metal salt in situ as an hydroxide the metallic compound is "locked" within the resin so that the initial distribution of metal ions is maintained during drainage and drying.

The impregnated microspheres must be carefully dried at a temperature from 60°–80° C. to avoid a rapid escape of vapor which can cause the hollow microspheres to explode. The dried microspheres are then carbonized by heating slowly in an inert atmosphere to a temperature of 900°–1000° C. The carbonization step prior to ignition is necessary to preserve the structural integrity of the microsphere in that a large escape of volatiles coupled with the escape of combustion products will explode the microsphere as well as carry off portions of the metallic compound or intermetallic compounds formed during the process.

After carbonization the impregnated carbonized microspheres are ignited in air at a temperature of approximately 1000° C. for 30 minutes to remove substantially all carbon and to produce the oxide. The resulting metal oxide is also sintered to form a structurally stable product during ignition. This leaves a highly porous reticulated type shell structure in the form of a microsphere.

It is not exactly understood how the entire reaction proceeds, but it is postulated that some of the hydroxide constituent is dehydrolyzed during the drying and carbonizing steps. Some of the resulting oxide is reduced during carbonization due to the presence of excess carbon to a suboxide or to the free metal. During ignition the remaining hydroxide is dehydrolyzed and the suboxides and metals are reoxidized back to the stable oxides. This proposed mechanism is submitted merely as an aid to understanding the invention and constitutes neither a part nor a limitation upon the scope of the invention.

The resulting microspheres can be virtually any desired size, depending upon the size of the starting resin microspheres. Hollow microspheres ranging in diameter from 50 microns to 10 millimeters have been prepared by the process of this invention. The resulting metal oxide microspheres have densities ranging from 0.07 to 0.2 gram per cubic centimeter.

The hollow metal oxide spheres can then be bound together into low density syntactic bodies by using a ceramic bonding agent such as tetraethyl orthosilicate, sodium silicate, or a commercial refractory cement such as "Sauereisen" cement available from Sauereisen Cements Company, Pittsburgh, Pa., or "Nicrobraz" cement available from Wall-Colmonoy Corp., Detroit, Mich. The "Sauereisen" cement is characterized as an aluminum silicate, $3 Al_2O_3 \cdot 2SiO_2$. "Nicrobraz" cement is characterized as being a proprietary liquid vehicle and binder for general use in brazing filler metals. Tetraethyl orthosilicate is a liquid having a specific gravity of 0.935 which is available commercially from Union Carbide Corporation and which has widespread use as a refractory mold binder. It has the ability to hydrolyze and deposit silica from solution. Hydrolysis can be accomplished by using water and approximately 1 wt. percent hydrochloric acid as a catalyst. In order to form the syntactic bodies, the oxide microspheres are merely coated with the particular binding agent and placed into a container having a desired shape. The container along with the coated microspheres is placed into a drying oven where the temperature is from 70° to 100° C. to set the binder. When the binder is set the syntactic body, now having the shape of the container, is removed. The syntactic body which results is suitable for filtering purposes or for shock absorbing purposes. If the syntactic body is to be used in a high temperature application the body should be further bonded by firing in a kiln to sinter the particles to one another. Syntactic bodies produced by the method of this invention have bulk densities ranging from 0.1 to 0.25 gram per cubic centimeter.

Metal oxides which have been formed into microspheres include silicon dioxide, aluminum oxide, calcium oxide, magnesium oxide and zirconium oxide. The process can be adapted to include most metal oxides. Oxides which can readily be used include BeO, the rare earth oxides including yttria, and the actinide oxides as well as other refractory oxides.

The following specific examples are given as an illustration of the embodiments of this invention. They are meant to be exemplary in nature rather than limiting on the scope of the invention which is defined by the appended claims.

EXAMPLE I

A 10 gram batch of epoxy resin microspheres having a diameter of 2 to 4 millimeters was soaked for approximately 16 hours in a saturated solution of sodium metasilicate. Metallic hydroxides were precipitated in situ by adjusting the pH of the solution to approximately 10 with 7 N ammonium hydroxide. After the hydroxide precipitation, the microspheres were placed in an oven and dried in an air atmosphere at 60° C. for 16 hours. The dried microspheres were heated slowly to 950° C. over a three day period in a nitrogen atmosphere and held there for approximately one hour which carbonized the microspheres. The carbonized microspheres were then ignited in air for 30 minutes at 1000° C. to remove the carbon and leave hollow inorganic microspheres made of soda, silica and inorganic impurities originally present in the epoxy resin. The resulting microspheres had an average diameter of approximately 3 millimeters and a density of approximately 0.2 gram per cubic centimeter.

EXAMPLE II

Approximately 5 grams of hollow inorganic microspheres containing aluminum, calcium and magnesium were prepared from 7 grams of epoxy microspheres having a diameter of 2 to 4 millimeters. The epoxy microspheres were soaked in an aqueous solution containing 10 grams of aluminum chloride, 10 grams of calcium chloride, and 10 grams of magnesium chloride per 100 milliliters of solution for approximately 24 hours at 25° C. The metals in the impregnated microspheres were precipitated in situ as hydroxides by adjusting the pH of the solution to approximately 10 by adding 7 N ammonium hydroxide. After the hydroxide precipitation, the microspheres were dried at a temperature of 60° C. for 16 hours in air. The microspheres were then carbonized by heating slowly to 950° C. in a nitrogen atmosphere. The carbonized microspheres were ignited in air with a propane torch for 30 minutes to remove the carbon and leave white inorganic microspheres. Data from spectrographic and X-ray analysis indicated that the microspheres contained silica, aluminum oxide, calcium oxide, magnesium oxide and the impurities originally present in the resin microspheres. The microspheres had an average size of 3 millimeters with a wall thickness of approximately 17 microns. The microspheres prepared by this example had a fibrous asbestos like appearance. It was found from experiments with this composition that microspheres of varying product diameters had bulk densities which varied inversely as a function of the diameter. Product microspheres having a diameter of 3, 7 and 10 millimeters, respectively, had densities of 0.212, 0.177 and 0.136 gram per cubic centimeter.

EXAMPLE III

Approximately 10 grams of hollow inorganic microspheres having zirconia as a major constituent were prepared from hollow epoxy resin microspheres whose diameter ranged from 2 to 4 millimeters. The epoxy microspheres were soaked in an aqueous solution containing 20 grams of zirconyl chloride per 100 milliliters of solution for 24 hours at 25° C. The pH of the solution was adjusted to approximately 10 with 7 N ammonium hydroxide to precipitate the zirconium hydroxide in situ. The impregnated microspheres were then dried in air at 60° C. for 24 hours. The microspheres were placed in a furnace, having an argon atmosphere, and slowly heated over a three day heating period to 1000° C. to carbonize the microspheres. The carbon was then removed from the microspheres by igniting them in air at 1000° C. for 30 minutes to leave hollow zirconium oxide microspheres. The microspheres had an average diameter of 3.59 millimeters and an average compressive strength of 2.6 ounces. The density of the zirconia microspheres was approximately 0.3 gram per cubic centimeter.

EXAMPLE IV

The microspheres prepared by the method of Example II were bound together into a low density syntactic body by binding with hydrolyzed tetraethyl orthosilicate. Approximately 5 grams of microspheres from Example II were mixed with approximately 10 milliliters of tetraethyl orthosilicate and 5 milliliters of 1 wt. percent hydrochloric acid and placed into a cylindrical glass container that had been sprayed with a fluorocarbon lubricant and anti-sticking agent on the interior. The container and material were placed into a drying oven at approximately 80° C. for 16 hours. Upon removal from the oven, the syntactic body easily fell from the container and easily sustained its own weight. The resulting syntactic body had a bulk density of approximately 0.2 gram per cubic centimeter.

What is claimed is:

1. A method of making porous hollow microspheres composed of a metal oxide selected from the group consisting of silicon oxide, aluminum oxide, calcium oxide, magnesium oxide, and zirconium oxide comprising the steps of soaking hollow thermosetting resin microspheres with a solution comprising an oxidizable salt of said metal oxide to impregnate said resin with said solution, adding ammonium hydroxide to said solution to precipitate said metal as an hydroxide in situ within said resin of said microspheres to form impregnated microspheres, drying said impregnated microspheres, carbonizing said impregnated microspheres, and heating the carbonized microspheres in an oxidizing atmosphere to a temperature effective to remove substantially all of the carbon by oxidation and to form said metal oxide.

2. A method according to claim 1 in which said carbonizing step comprises heating the impregnated microspheres in an inert atmosphere to a temperature effective to pyrole said resin.

3. A method according to claim 1 wherein said porous hollow microspheres are composed of a mixture of metal oxides, and a mixture of oxidizable metal salts is impregnated into said resins microspheres from said solution.

4. A method according to claim 1 wherein said metal oxide is zirconium oxide and said oxidizable compound is zirconyl chloride.

5. A method according to claim 1 wherein said thermosetting resin is an epoxy resin.

6. A method according to claim 1 wherein said heating step is carried out to a temperature of about 900°–1000° C.

7. The method according to claim 1 wherein said thermosetting resin is selected from the group consisting of polyfurfuryl alcohol, vinylidene-acrylonitrile copolymer, and styrene divinylbenzene copolymer, phenolic and epoxy resins.

8. The method according to claim 1 wherein said salt is selected from the group consisting of halides, nitrides, sulfates, oxychlorides, acetates and soluble silicates.

References Cited

UNITED STATES PATENTS

| | | | |
|---|---|---|---|
| 3,385,915 | 5/1968 | Hamling | 252—301.1 X |
| 3,535,264 | 10/1970 | Hackstein et al. | 264—0.5 X |
| 3,594,332 | 7/1971 | Michel | 252—448 |
| 3,397,257 | 8/1968 | Brambilla et al. | 264—0.5 |
| 3,586,742 | 6/1971 | Chin et al. | 264—0.5 |
| 3,438,749 | 4/1969 | Lonadier et al. | 264—0.5 X |
| 3,663,182 | 5/1972 | Hamling | 264—DIG. 19 X |
| 3,464,928 | 9/1969 | Mathies | 252—448 X |
| 3,558,508 | 1/1971 | Keith et al. | 252—448 X |

DONALD J. ARNOLD, Primary Examiner

U.S. Cl. X.R.

252—301.1; 264—0.5, 29, 65